(12) United States Patent
Inkmann

(10) Patent No.: US 11,197,792 B1
(45) Date of Patent: Dec. 14, 2021

(54) LIFT ASSIST DEVICE FOR A MOBILITY APPARATUS

(71) Applicant: Mark S. Inkmann, Wauwatosa, WI (US)

(72) Inventor: Mark S. Inkmann, Wauwatosa, WI (US)

( * ) Notice: Subject to any disclaimer, the term of this patent is extended or adjusted under 35 U.S.C. 154(b) by 0 days.

(21) Appl. No.: 17/373,039

(22) Filed: Jul. 12, 2021

(51) Int. Cl.
| | |
|---|---|
| *A61G 5/14* | (2006.01) |
| *F16H 25/20* | (2006.01) |
| *A61H 3/04* | (2006.01) |
| *A61G 5/02* | (2006.01) |
| *A61G 5/04* | (2013.01) |

(52) U.S. Cl.
CPC .............. *A61G 5/14* (2013.01); *A61H 3/04* (2013.01); *F16H 25/20* (2013.01); *A61G 5/02* (2013.01); *A61G 5/04* (2013.01); *F16H 2025/2081* (2013.01)

(58) Field of Classification Search
CPC ... A61G 5/04; A61G 5/02; A61G 5/14; A16H 3/04; F16H 2025/2081; F16H 25/20
See application file for complete search history.

(56) References Cited

U.S. PATENT DOCUMENTS

| | | | |
|---|---|---|---|
| 5,411,044 A * | 5/1995 | Andolfi ................ | A61G 7/1017 135/66 |
| 5,778,996 A * | 7/1998 | Prior ..................... | A61G 5/045 180/65.1 |
| 8,770,212 B2 | 7/2014 | Alghazi | |

* cited by examiner

*Primary Examiner* — Jonathan Ng
*Assistant Examiner* — James J Triggs
(74) *Attorney, Agent, or Firm* — Donald J. Ersler

(57) ABSTRACT

A lift assist device preferably includes a pair of lift units and a battery. Each lift unit preferably includes a linear actuator, a lift projection, a top bracket and a bottom bracket. A screw sled extends from one side of the linear actuator. An end of a lift projection is secured to the screw sled. One end of the top bracket is attached to a top of the linear actuator. One end of a bottom bracket is attached to a bottom of the linear actuator. The top and bottom brackets will be different depending on whether they are attached to rollators, wheelchairs, motorized wheelchairs and motorized scooters. The lift assist device may be used to help lift a user from a chair adjacent the rollator, wheelchair, motorized wheelchair or motorized scooter, or when the user is seated in rollator, wheelchair, motorized wheelchair or motorized scooter.

20 Claims, 18 Drawing Sheets

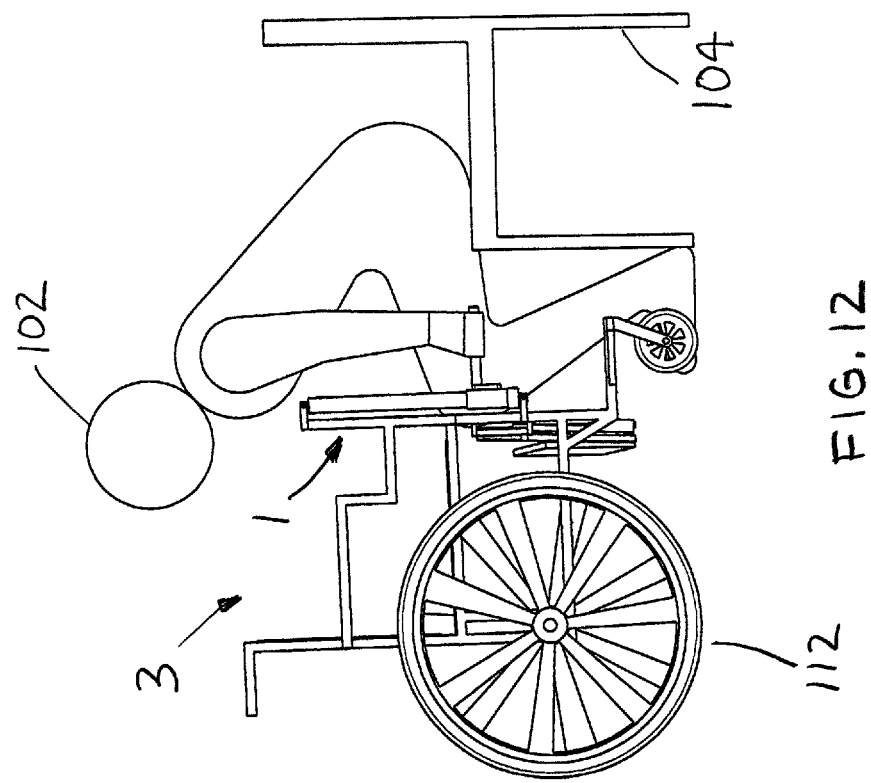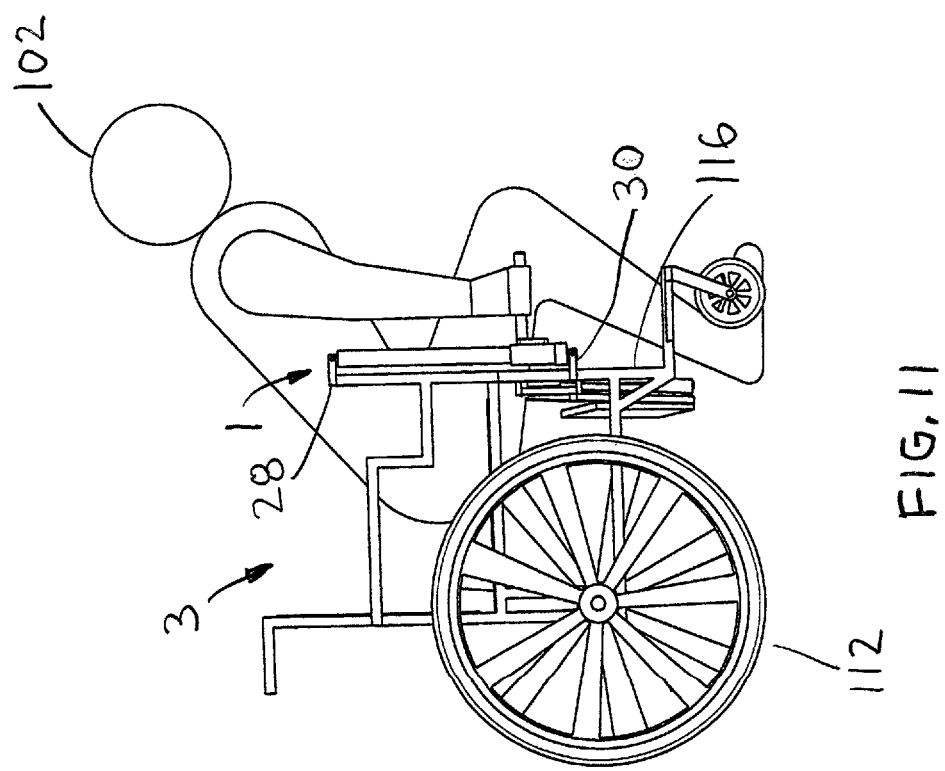

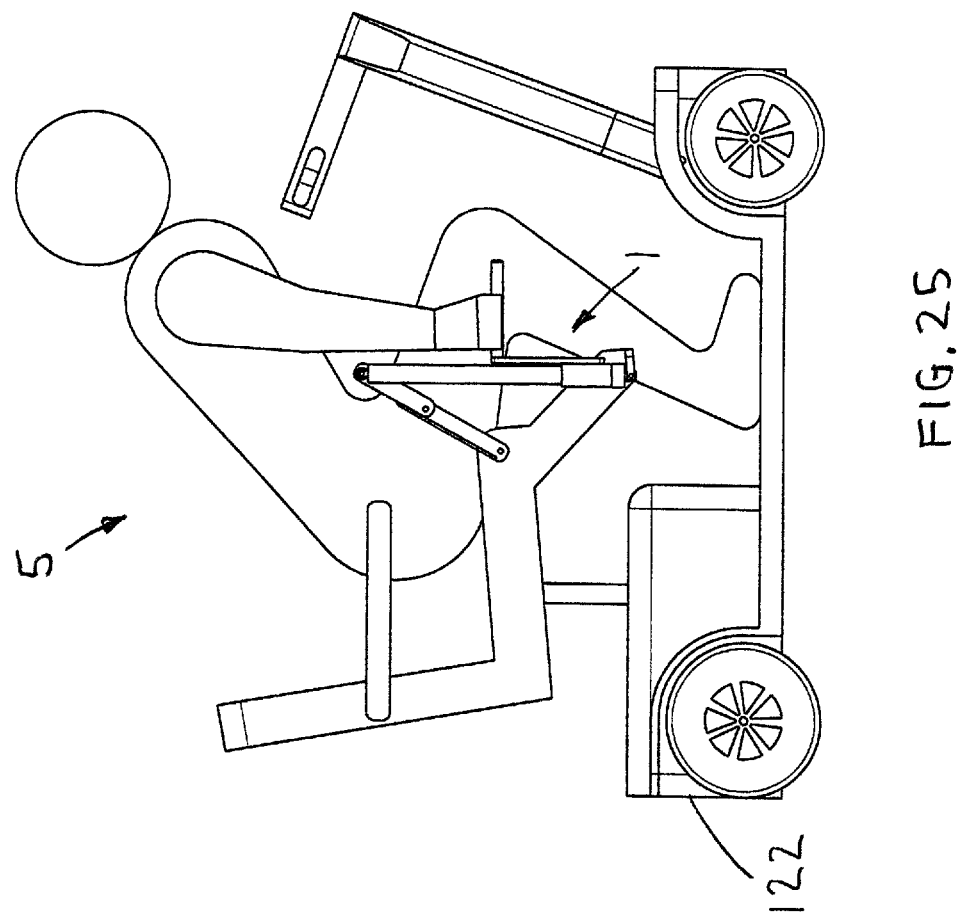

LIFT ASSIST DEVICE FOR A MOBILITY APPARATUS

BACKGROUND OF THE INVENTION

1. Field of the Invention

The present invention relates generally to human mobility and more specifically to a lift assist device for a mobility apparatus, which aids a user transitioning from a sitting position to a standing position.

2. Discussion of the Prior Art

Walking is important because it is very helpful in maintaining overall physical and emotional health. Walkers and rollators are very popular devices used to provide stability and support during walking. They generally are lightweight, low cost, compact, foldable, portable, and many include seats. The need for stability and support may be the result of ageing, joint pain, surgeries, neuromotor issues, balance issues, or other medical conditions that can reduce back, hip, quadricep, or knee strength.

A significant issue arises when a medical condition that requires the use of a rolling walker (rollator) for walking also limits the ability of the user to rise from a seated position to use the rollator. In addition, the act of sitting down also has increased risks because there is a tendency to sit down too fast with less control and stability. This is particularly severe just prior to contacting the seat when the bend of the knee is at its maximum and its weakest. This inability or difficulty in rising or descending makes the user dependent upon help from others, mechanical devices, or a combination of the two. The devices are generally cumbersome and most also require assistance. The user usually becomes dependent upon the availability of others to assist even for simple tasks such as crossing a room to sit in another chair, go to the bathroom, etc. This also generally decreases the duration and frequency of walking. U.S. Pat. No. 8,770,212 to Alghazi discloses a method of operation of a portable multifunctional mobility aid apparatus.

Accordingly, there is a clearly felt need in the art for a lift assist device for a mobility apparatus, which aids a user transitioning from a sitting position to a standing position, or from a standing position to a sitting position.

SUMMARY OF THE INVENTION

The present invention provides a lift assist device for a mobility apparatus, which aids a user transitioning from a standing position to a sitting position. The lift assist device preferably includes a pair of lift units and a battery. Each lift unit preferably includes a linear actuator, a lift projection, a top bracket and a bottom bracket. The battery is preferably a lithium-ion battery for reduced weight. The linear actuator is preferably an electrical lead screw actuator. A screw sled extends from one side of the linear actuator. The screw sled moves with a lead screw, because the screw sled is threadably engaged with the lead screw. An end of a lift projection is secured to the screw sled. One end of the top bracket is attached to a top of the linear actuator. One end of a bottom bracket is attached to a bottom of the linear actuator. The top and bottom brackets will be different depending on whether they are attached to rolling walkers (rollators), wheelchairs, motorized wheelchairs and motorized scooters. However, the linear actuator may be attached to a mobility device with at least one bracket attached along a length of the linear actuator. The lift assist device may be used to help lift a user from a chair adjacent the rollator, wheelchair, motorized wheelchair or motorized scooter, or when the user is seated in the rollator, wheelchair, motorized wheelchair or motorized scooter. Further, the lift assist device may be used to allow a user to ease themself into a chair, wheelchair, motorized wheelchair or motorized scooter.

A rollator lift assist device preferably includes the lift assist device, a rollator top pivot bracket and a rollator bottom bracket. The rollator top pivot bracket is pivotally engaged with a top end of one of two front wheel support tubes. The rollator bottom bracket is attached along a length of one of two rear wheel support tubes. A hand brake lever of the rollator may be attached to each lift projection. The rollator top pivot bracket allows the rollator to be collapsed without detaching the lift assist device from the rollator. A wheelchair lift assist device preferably includes the lift assist device, a wheelchair top bracket and a wheelchair bottom bracket. The wheelchair top bracket is secured to a front hand rail of the wheelchair. The wheelchair bottom bracket is attached along a length of a front hand rail support.

A motorized wheelchair lift assist device preferably includes the lift assist device, a wheelchair top pivoting bracket and a wheelchair bottom bracket. The wheelchair top pivoting bracket preferably includes a first wheelchair leg and a second wheelchair leg. One end of the first wheelchair leg is pivotally engaged with one end of the second wheelchair leg. An opposing end of the first wheelchair leg is pivotally attached to a top of the linear actuator. An opposing end of the second wheelchair leg is pivotally secured to a seat side frame of the motorized wheelchair. One end of the wheel chair bottom bracket is attached to a bottom of the seat side frame. A bottom of the linear actuator is pivotally engaged with an opposing end of the wheelchair bottom bracket.

A motorized scooter lift assist device preferably includes the lift assist device, a scooter top pivoting bracket and a scooter bottom bracket. The scooter top pivoting bracket preferably includes a first scooter leg and a second scooter leg. One end of the first scooter leg is pivotally engaged with one end of the second scooter leg. An opposing end of the first scooter leg is pivotally attached to a top of the linear actuator. An opposing end of the second scooter leg is pivotally secured to a seat side frame of the seat of the motorized scooter. One end of the scooter bottom bracket is attached to a bottom of the seat side frame. A bottom of the linear actuator is pivotally engaged with an opposing end of the wheelchair bottom bracket.

Accordingly, it is an object of the present invention to provide a lift assist device for a mobility apparatus, which aids in a user transitioning from a sitting position to a standing position, or from a standing position to a sitting position.

These and additional objects, advantages, features and benefits of the present invention will become apparent from the following specification.

BRIEF DESCRIPTION OF THE DRAWINGS

FIG. 11 is a side view of a user sitting in a wheel chair with their hands secured to lift projections of a lift assist device, before linear actuators have raised the lift projections of the wheel chair with a lift assist device in accordance with the present invention.

FIG. 12 is a side view of a user sitting on a chair with their hands secured to lift projections of lift assist device, before linear actuators have raised the lift projections of a wheel chair with a lift assist device in accordance with the present invention.

FIG. 25 is a side view of a user sitting in a chair of a motorized scooter with their hands secured to lift projections of a lift assist device, before linear actuators have raised the lift projections of a motorized scooter with a lift assist device in accordance with the present invention.

DETAILED DESCRIPTION OF THE PREFERRED EMBODIMENTS

Figure 1:
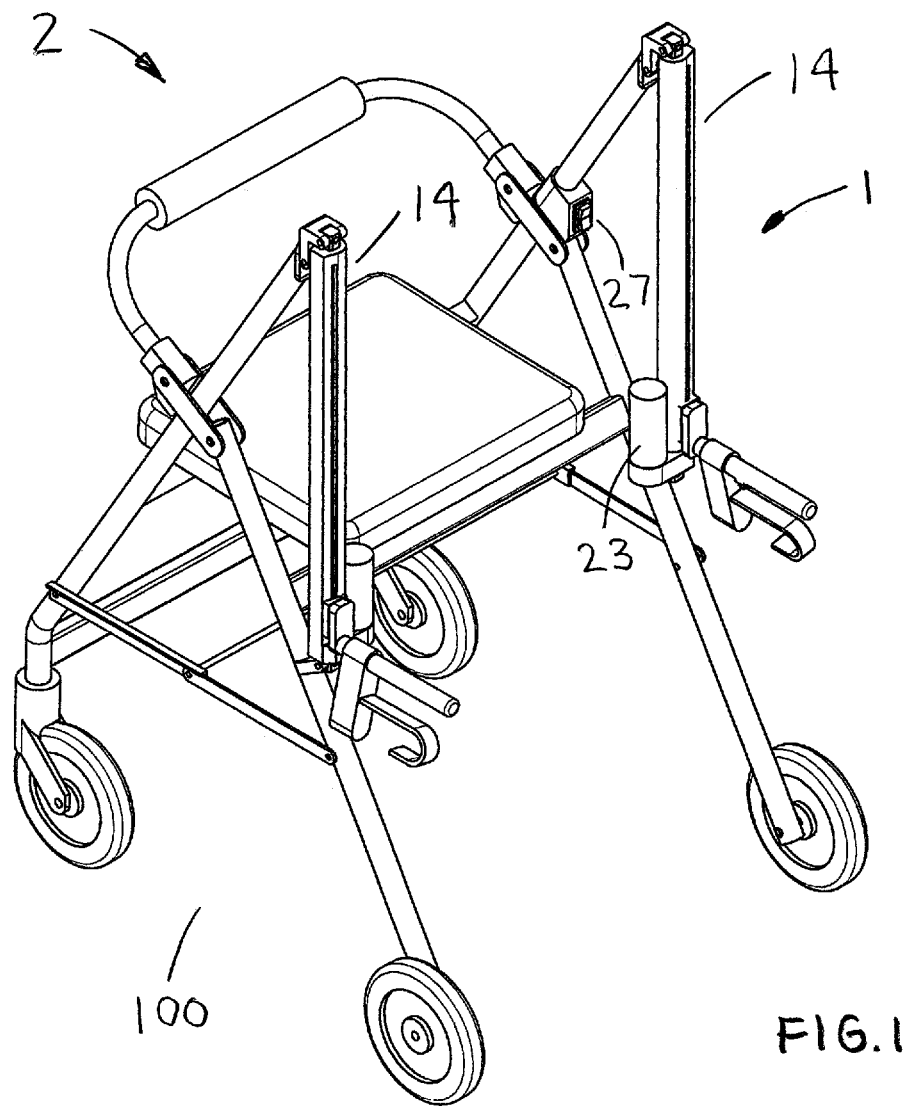
FIG. 1 is a perspective view of a lift assist device attached to a rollator in accordance with the present invention.
Figure 3:
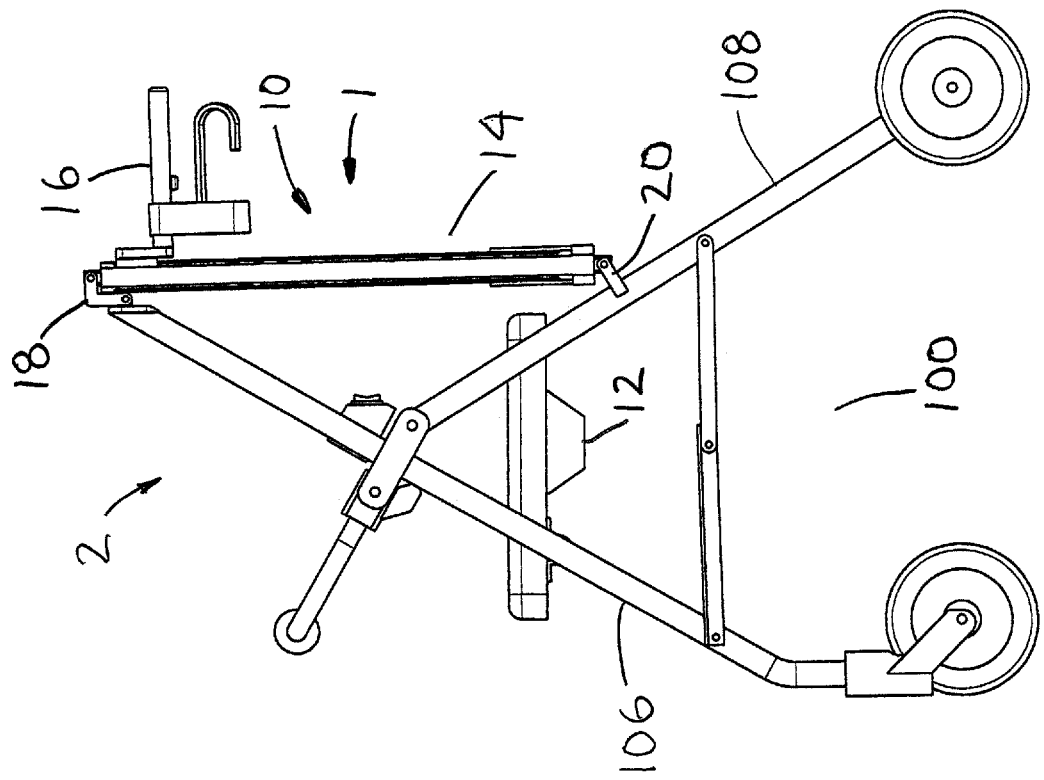
FIG. 3 is a side view of a lift assist device attached to a rollator and with lift projections in a raised position in accordance with the present invention.
Figure 2:
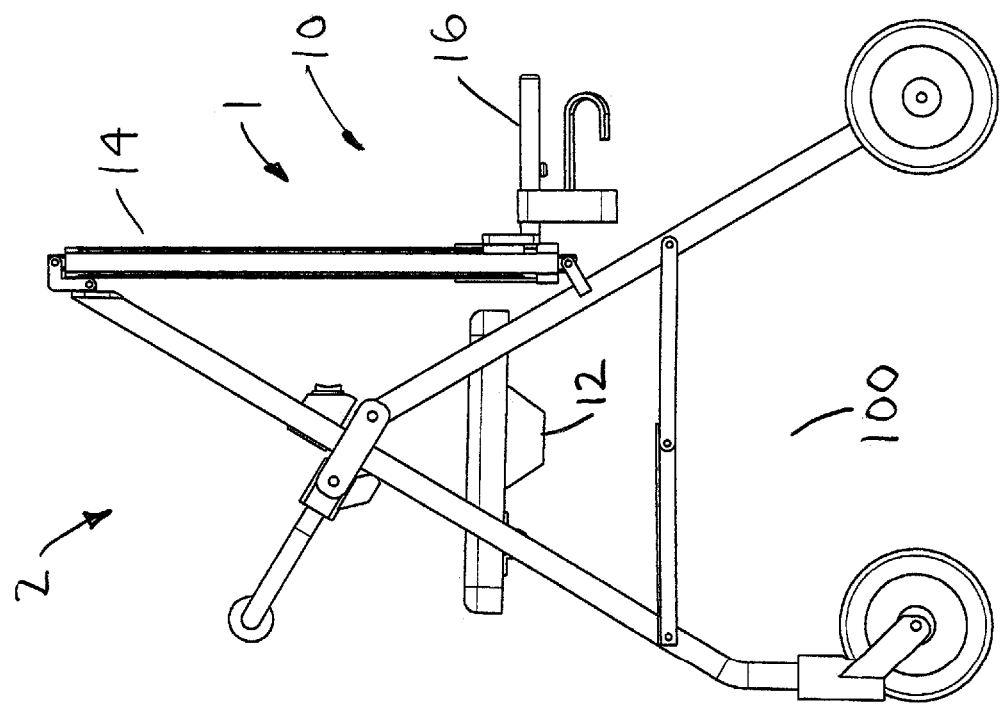
FIG. 2 is a side view of a lift assist device attached to a rollator and with lift projections in a lowered position in accordance with the present invention.

With reference now to the drawings, and particularly to FIG. 1, there is shown a perspective view of a lift assist device 1 attached to a (rolling walker) rollator 100. With reference to FIGS. 2-5, the lift assist device 1 preferably includes a pair of lift units 10 and a battery 12. Each lift unit 10 preferably includes a linear actuator 14, a lift projection 16, a top bracket 18 and a bottom bracket 20. The battery 12 is preferably a lithium-ion battery for reduced weight. The linear actuator 10 is preferably an electrical lead screw actuator, but other suitable linear actuators could also be used. Electrical lead screw actuators are well known in the art and need not be explained in further detail. Compactness and lightweight are two advantages of electrical lead screw actuators. Further, the electrical lead screw actuator 14 includes a screw sled 22, which extends from one side thereof. The screw sled 22 will actuate an entire length of the electrical lead screw actuator. The screw sled 22 moves in a linear direction when a motor 23 rotates a lead screw (not shown), because the screw sled 22 is threadably engaged with the lead screw. An end of a lift projection 24 is secured to the screw sled 22. The lift projection 24 preferably includes at least one on-off switch 26 to operate the two linear actuators 10.

Figure 4:
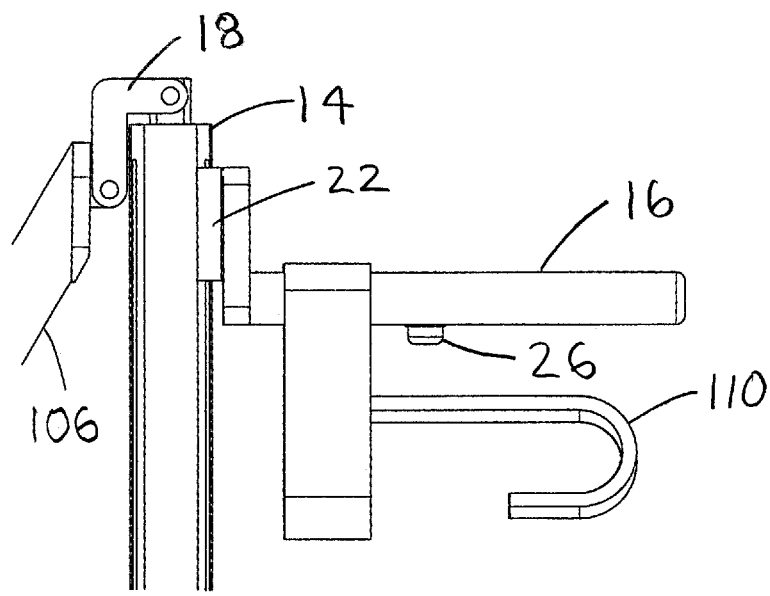
FIG. 4 is an enlarged side view of a lift projection attached to a sled of a linear actuator of a lift assist device in accordance with the present invention.
Figure 4A:
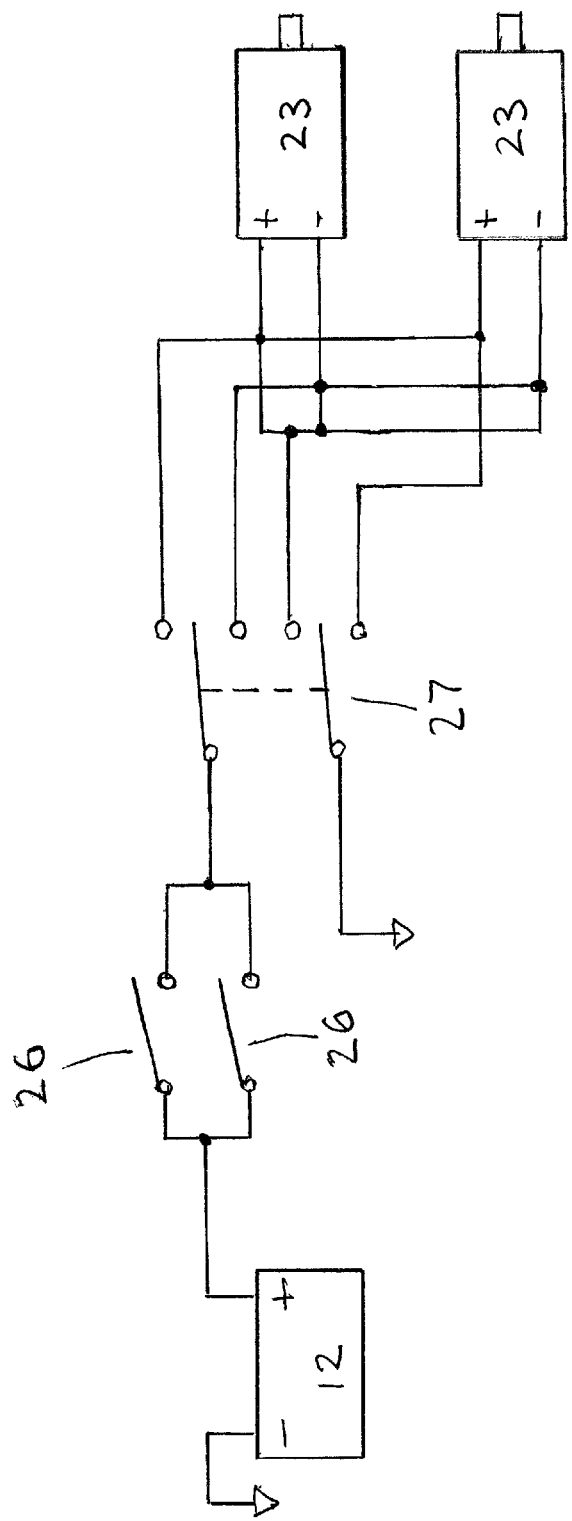
FIG. 4a is a schematic diagram of an electrical circuit for operating the two linear actuators of a lift assist device in accordance with the present invention.

FIG. 4a discloses an electrical schematic of the lift assist device 1. The pair of lift projections 16 of the pair of linear actuators 14 are operated by having one of the on-off switches 26 closed and an up-down switch 27 in either a raised position or a lowered position. The up-down switch is preferably a three position, double pull, double throw switch. The raised position allows the lift projections 16 to move in an upward direction. The lowered position allows the lift projections 16 to move in a downward direction. A pair electrical motors 23 of the pair of the linear actuators 14 will receive electrical power when one of the on-off switches is closed. The electrical motors 23 rotate the screw thread to move the screw sled 22 upward or downward. It is possible to have only one of the two lift projections 16 with the on-off switch 26.

Figure 7:
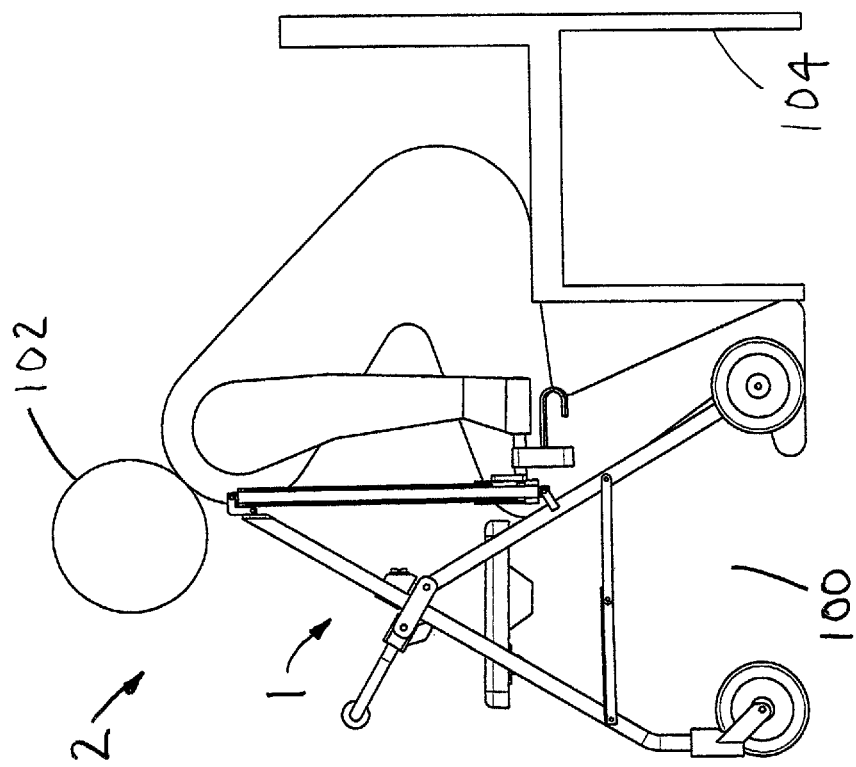
FIG. 7 is a side view of a user sitting on a chair with their hands secured to lift projections of lift assist device, before linear actuators have raised the lift projections of a rollator with a lift assist device in accordance with the present invention.
Figure 6:
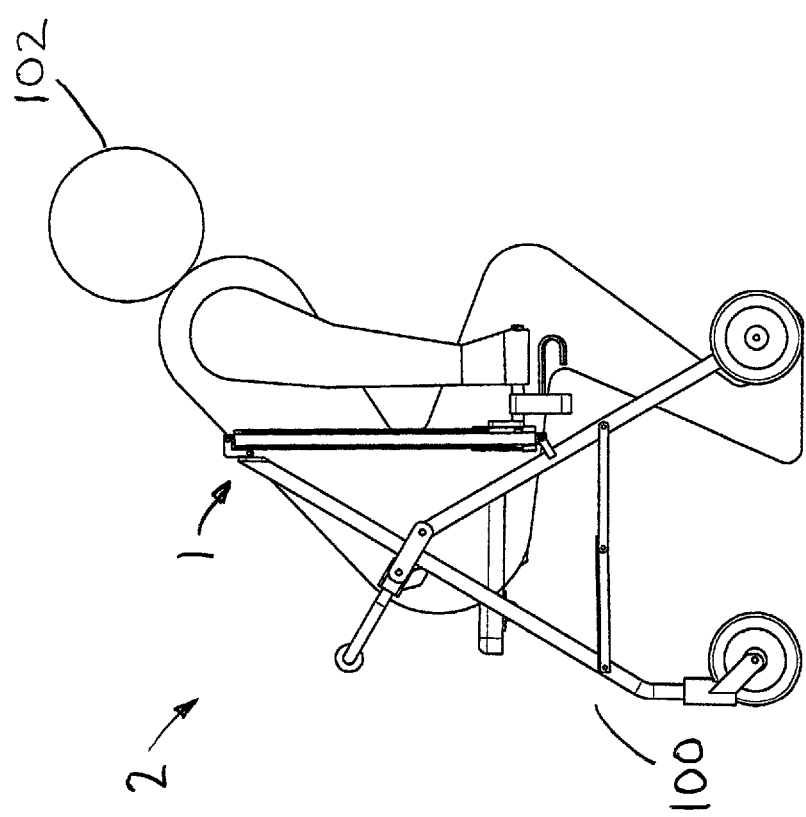
FIG. 6 is a side view of a user sitting in a rollator with their hands secured to lift projections of lift assist device, before linear actuators have raised the lift projections of a rollator with a lift assist device in accordance with the present invention.

One end of the top bracket 18 is pivotally attached to a top of the linear actuator 14 and the other end of the top bracket 18 is pivotally attached to a front wheel support tube 106. One end of a bottom bracket 20 is attached to a bottom of the linear actuator 14. The top and bottom brackets will be different depending on whether they are attached to rollators 100, wheelchairs, motorized wheelchairs and motorized scooters. With reference to FIGS. 6-7, the lift assist device 1 may be used to help lift a user 102 from a chair 104 adjacent the rollator 100, wheelchair, motorized wheelchair or motorized scooter, or when the user is seated in rollator 100, wheelchair, motorized wheelchair or motorized scooter. Further, the lift assist device 1 may be used to allow the user 100 to ease themself into the chair 104, wheelchair, motorized wheelchair or motorized scooter from a standing position.

Figure 5:
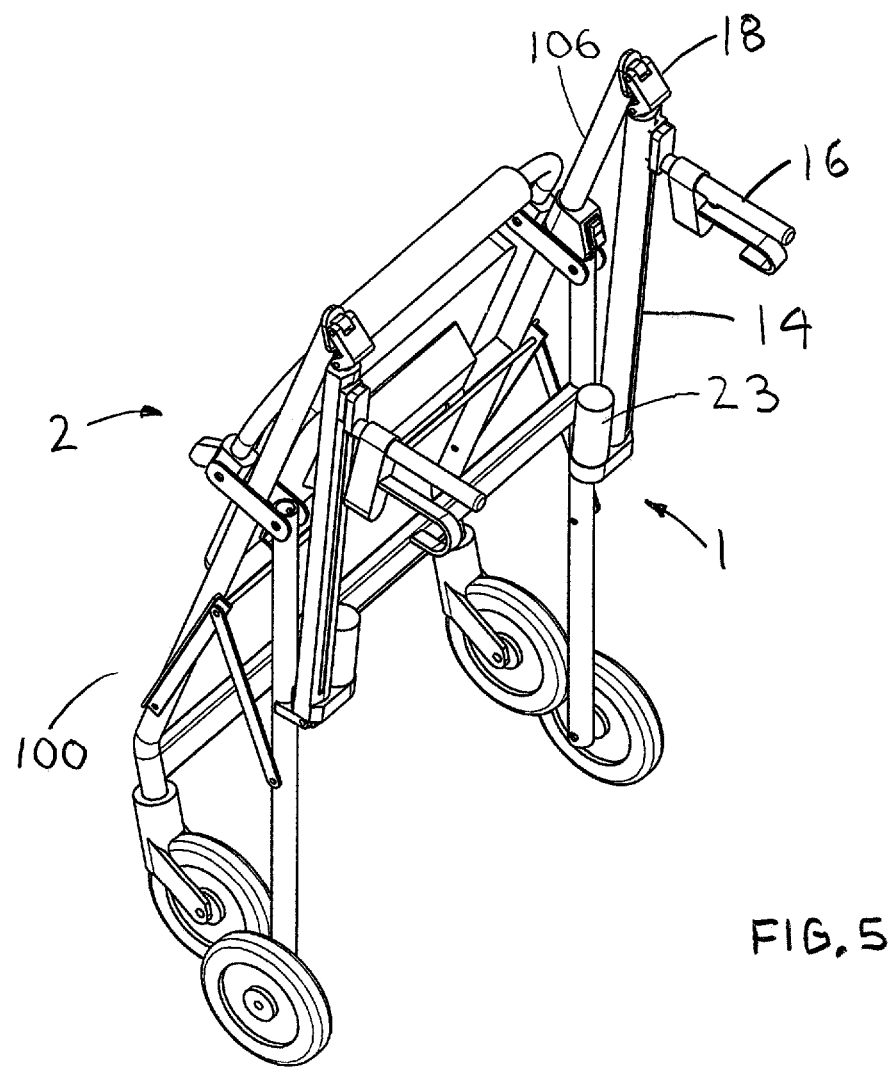
FIG. 5 is a perspective view of a lift assist device attached to a rollator and the rollator in a collapsed orientation in accordance with the present invention.

The rollator lift assist device 2 preferably includes the lift assist device 1, the rollator top pivot bracket 18 and the rollator bottom bracket 20. The rollator top pivot bracket 18 is pivotally engaged with a top end of one of two front wheel support tubes 106 of the rollator 100. The rollator bottom bracket 20 is attached along a length of one of two rear wheel support tubes 108 of the rollator 100. With reference to FIG. 4, a hand brake lever 110 of the rollator 100 may be retained on each lift projection 16. With reference to FIG. 5, the top pivot bracket 18 allows the rollator 100 to be collapsed without detaching the lift assist device 1 from the rollator 100.

Figure 8:
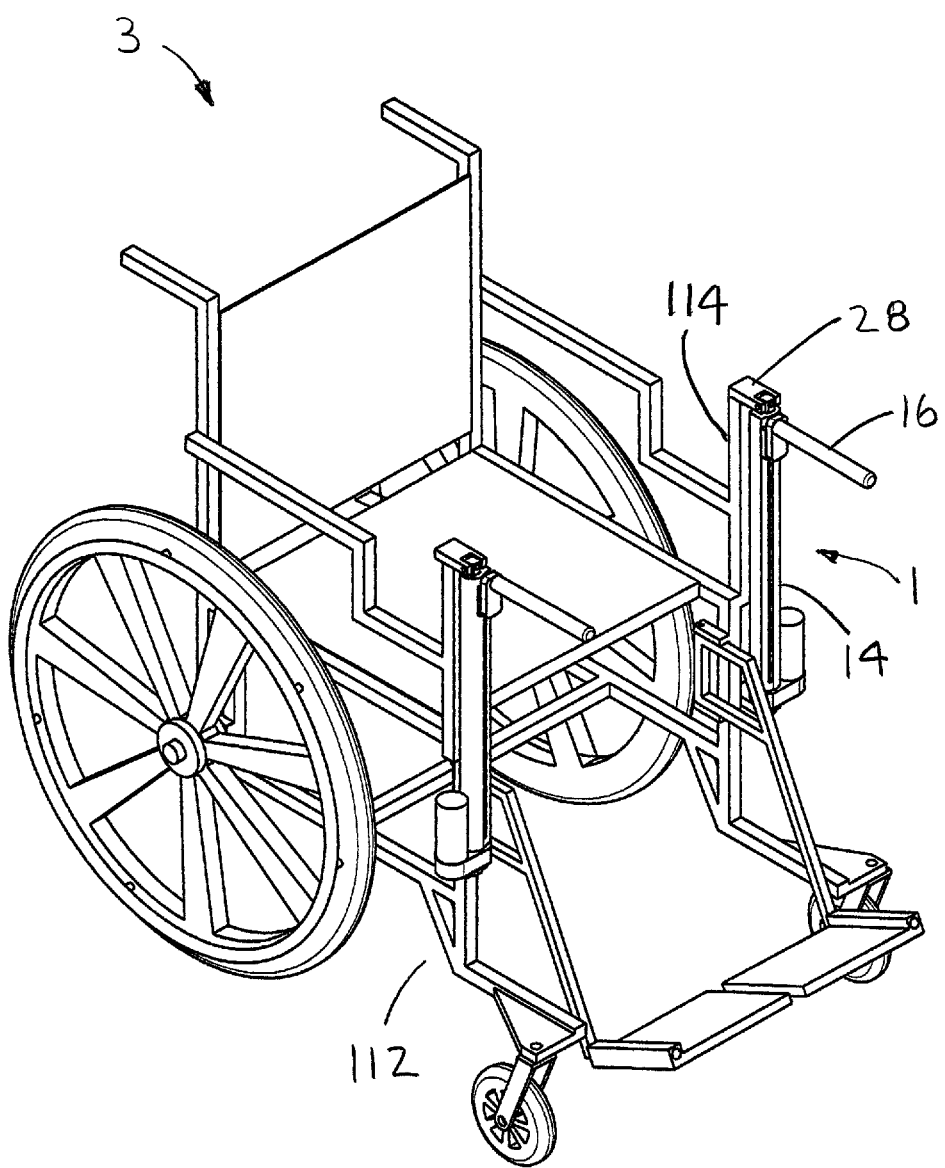
FIG. 8 is a perspective view of a lift assist device attached to a wheel chair in accordance with the present invention.
Figure 9:
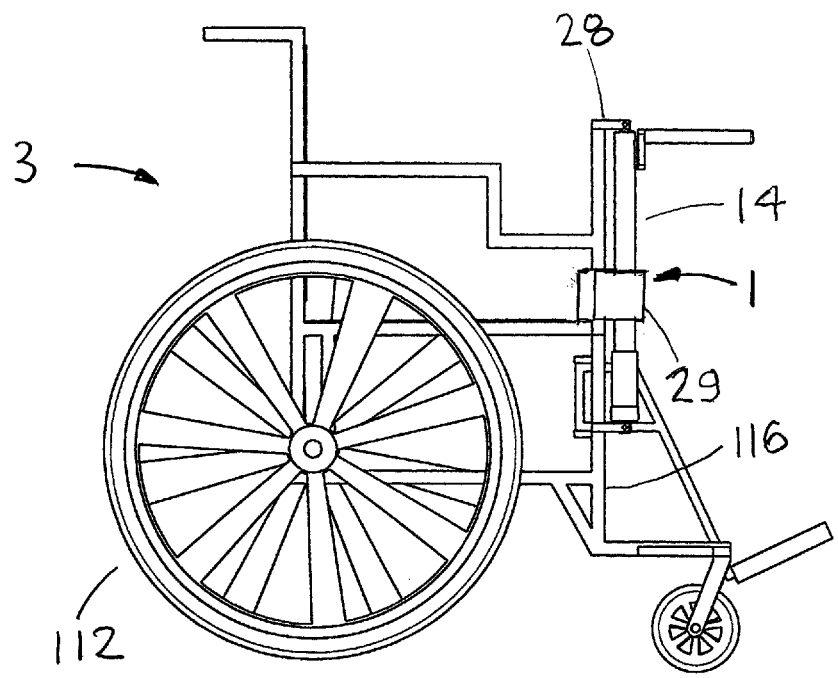
FIG. 9 is a side view of a lift assist device attached to a wheel chair and with lift projections in a raised position in accordance with the present invention.
Figure 10:
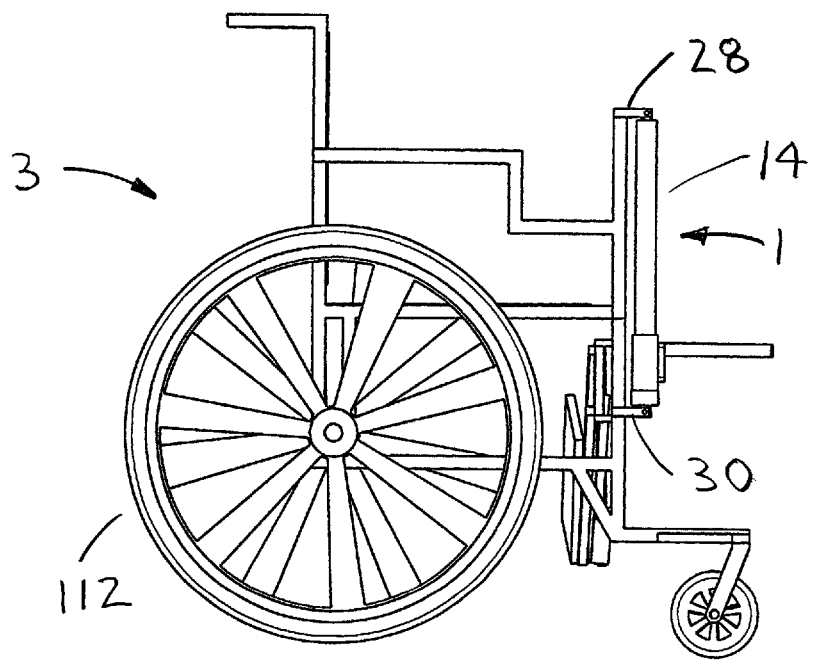
FIG. 10 is a side view of a lift assist device attached to a wheel chair and with lift projections in a lowered position in accordance with the present invention.
Figure 14:
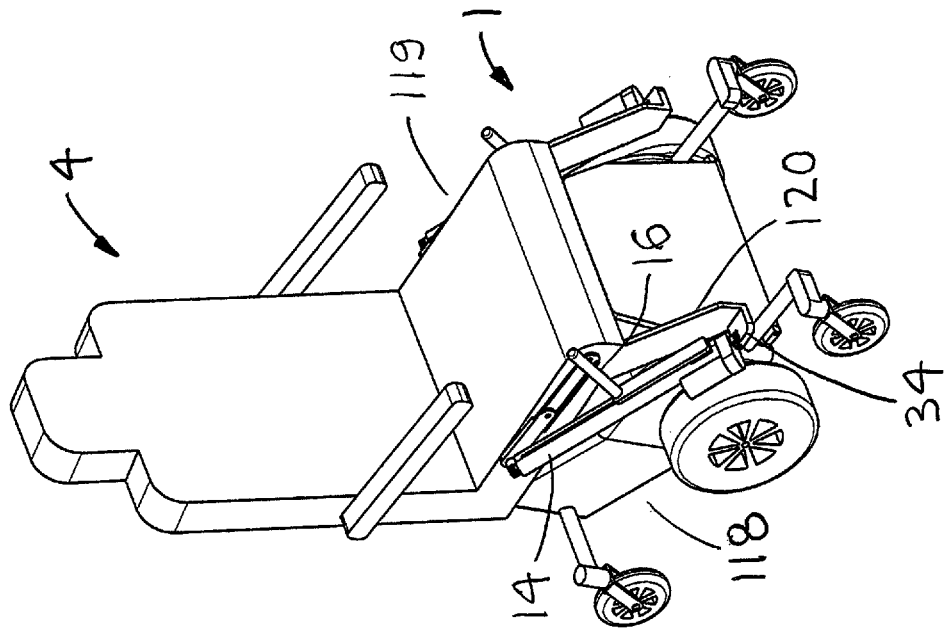
FIG. 14 is a perspective view of a lift assist device attached to a motorized wheel chair and positioned in a retracted position in accordance with the present invention.
Figure 13:
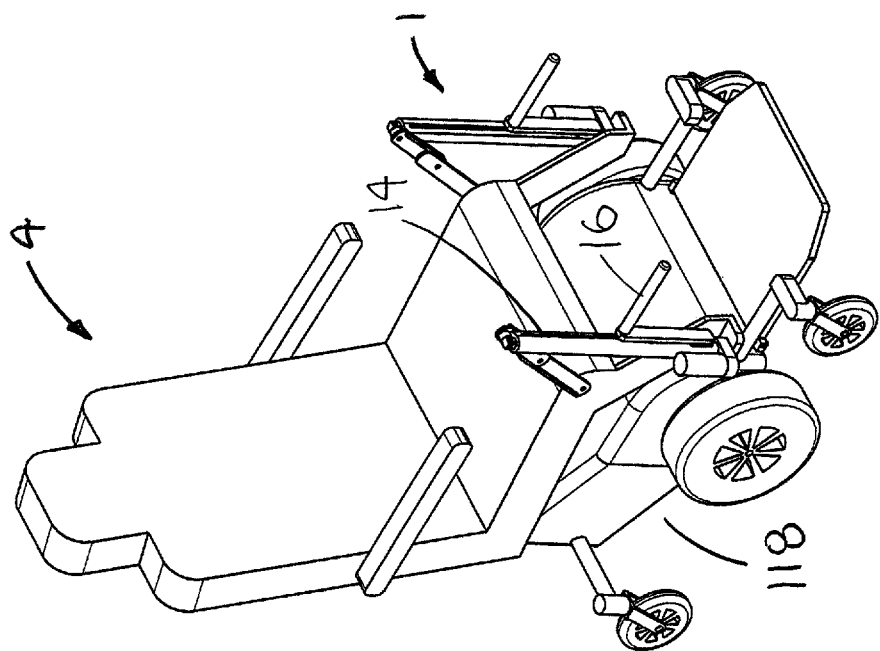
FIG. 13 is a perspective view of a lift assist device attached to a motorized wheel chair in accordance with the present invention.
Figure 16:
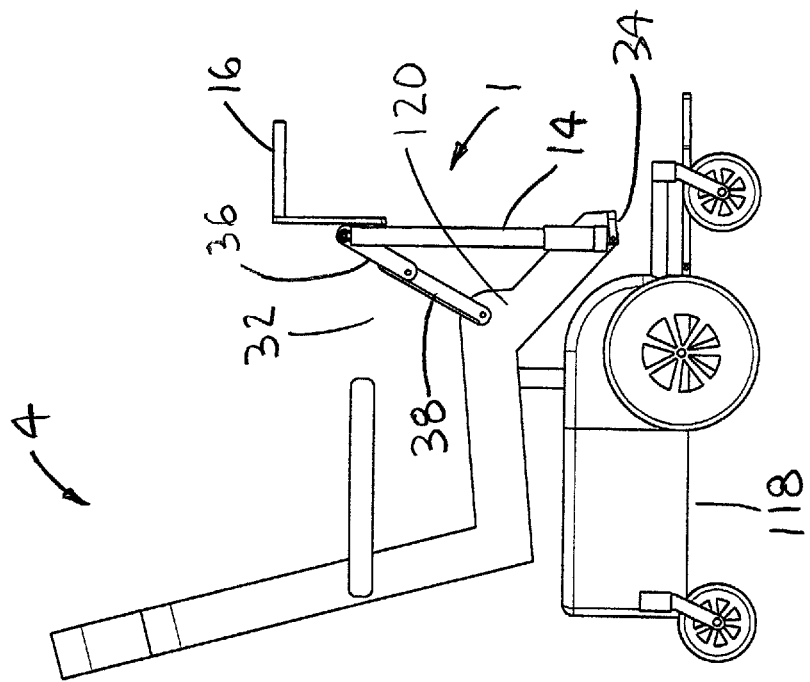
FIG. 16 is a side view of a lift assist device attached to motorized wheel chair and with lift projections in a raised position in accordance with the present invention.
Figure 15:
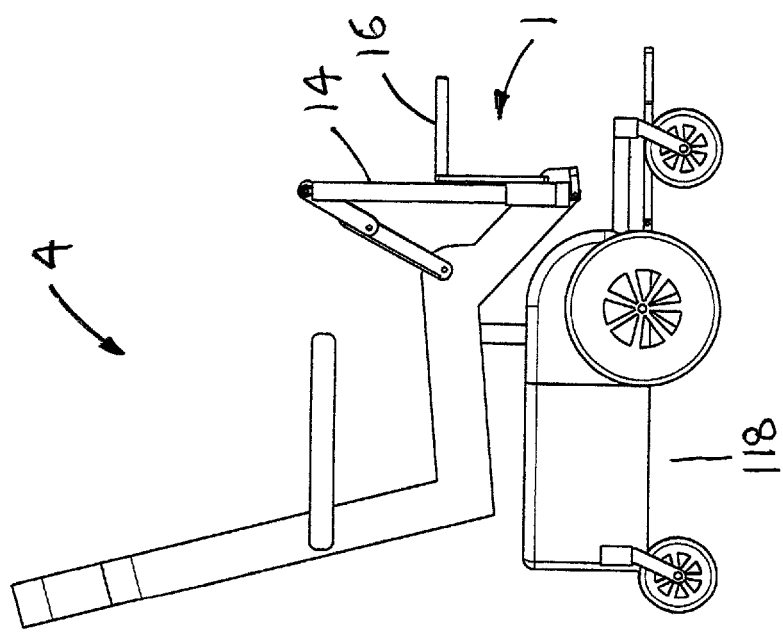
FIG. 15 is a side view of a lift assist device attached to a motorized wheel chair and with lift projections in a lowered position in accordance with the present invention.

With reference to FIGS. 8-10, a wheelchair lift assist device 3 preferably includes the lift assist device 1, a wheelchair 112, a wheelchair top bracket 28 and a wheelchair bottom bracket 30. The wheelchair top bracket 28 is secured to a front of hand rail 114 of the wheelchair 112. The wheelchair bottom bracket 30 is attached along a length of a front hand rail support 116. A single bracket 29 could also be used to attach the lift assist device 1 to the front hand rail support 116 instead of the top and bottom brackets 28, 30. With reference to FIGS. 11-12, the wheelchair lift assist device 3 may be used to help lift a user 102 from the chair 104 adjacent the wheelchair 112 or from the wheelchair 112. Further, the wheelchair lift assist device 3 may be used to allow the user 102 to ease themself into the chair 104 or the wheelchair 112.

Figure 17:
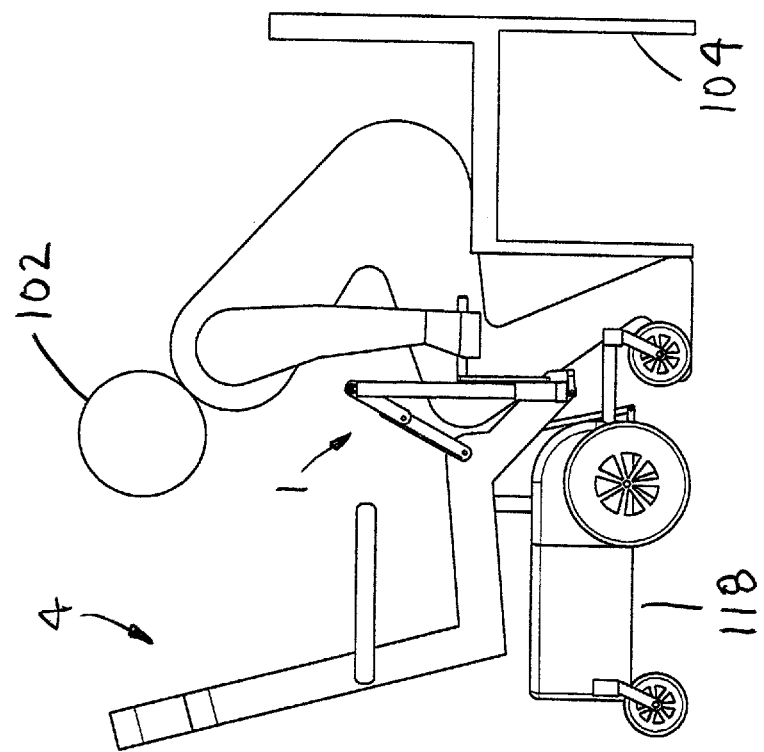
FIG. 17 is a side view of a user sitting in a motorized wheel chair with their hands secured to lift projections of a lift assist device, before linear actuators have raised the lift projections of a motorized wheel chair with a lift assist device in accordance with the present invention.
Figure 18:
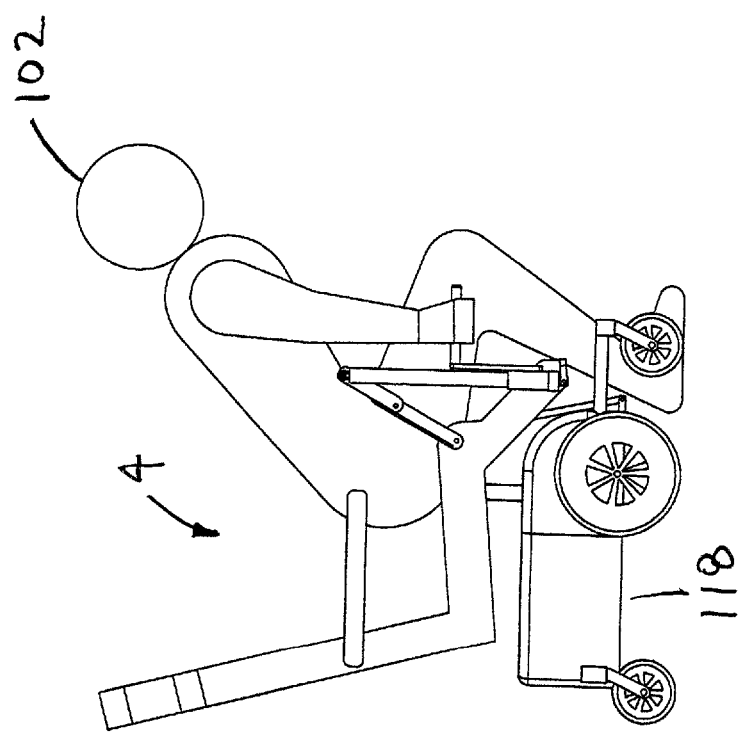
FIG. 18 is a side view of a user sitting on a chair with their hands secured to lift projections of lift assist device, before linear actuators have raised the lift projections of a motorized wheel chair with a lift assist device in accordance with the present invention.
Figure 19:
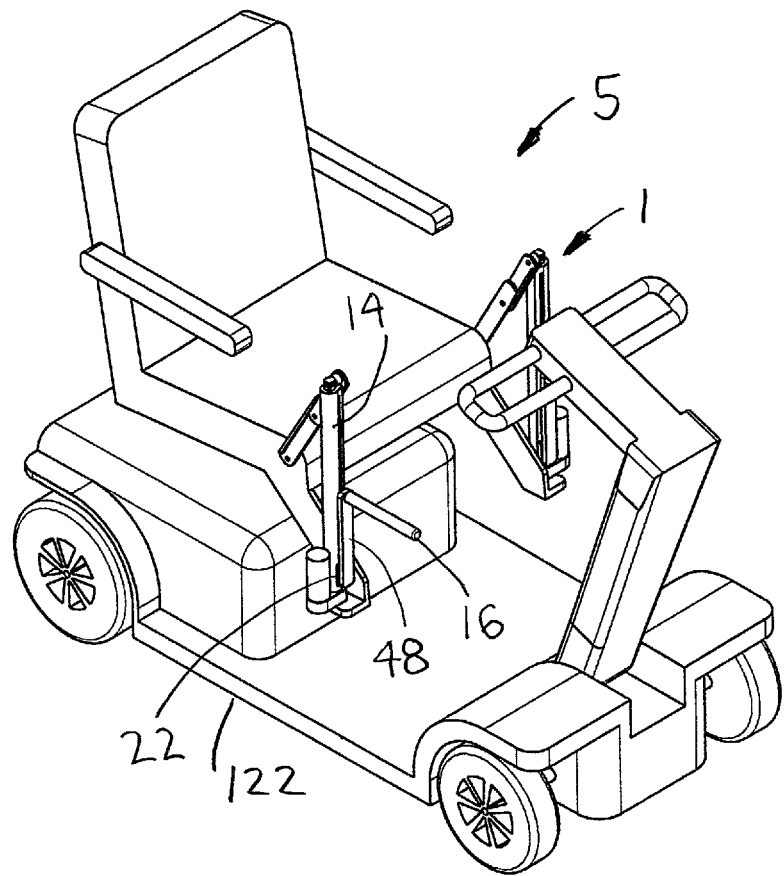
FIG. 19 is a perspective view of a lift assist device attached to a motorized scooter in accordance with the present invention.
Figure 20:
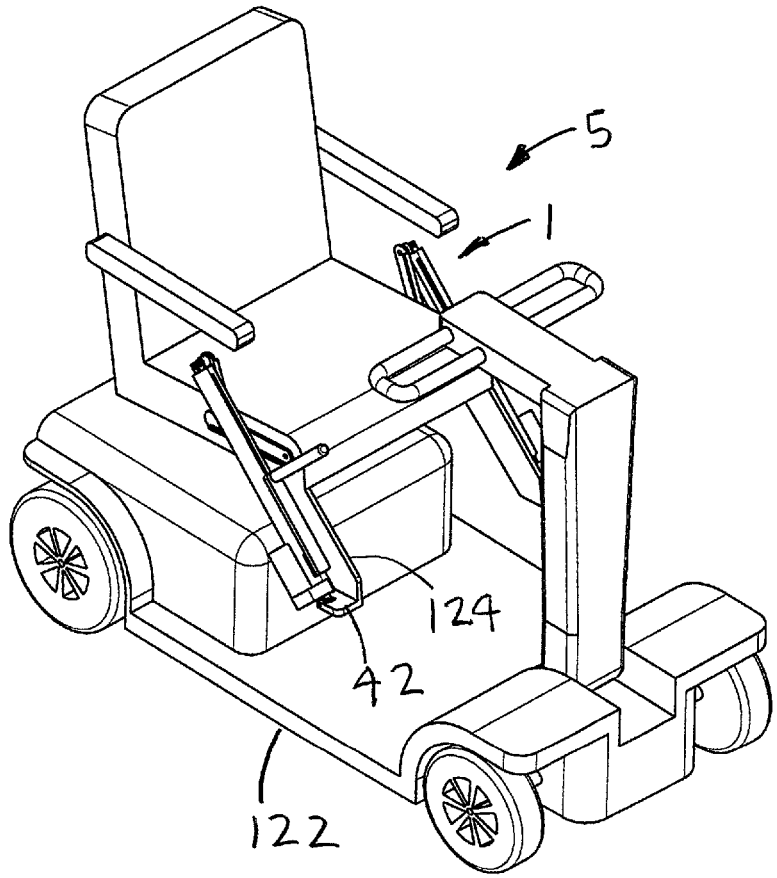
FIG. 20 is a perspective view of a lift assist device attached to a motorized scooter and the lift assist device positioned in a retracted position in accordance with the present invention.
Figure 21:
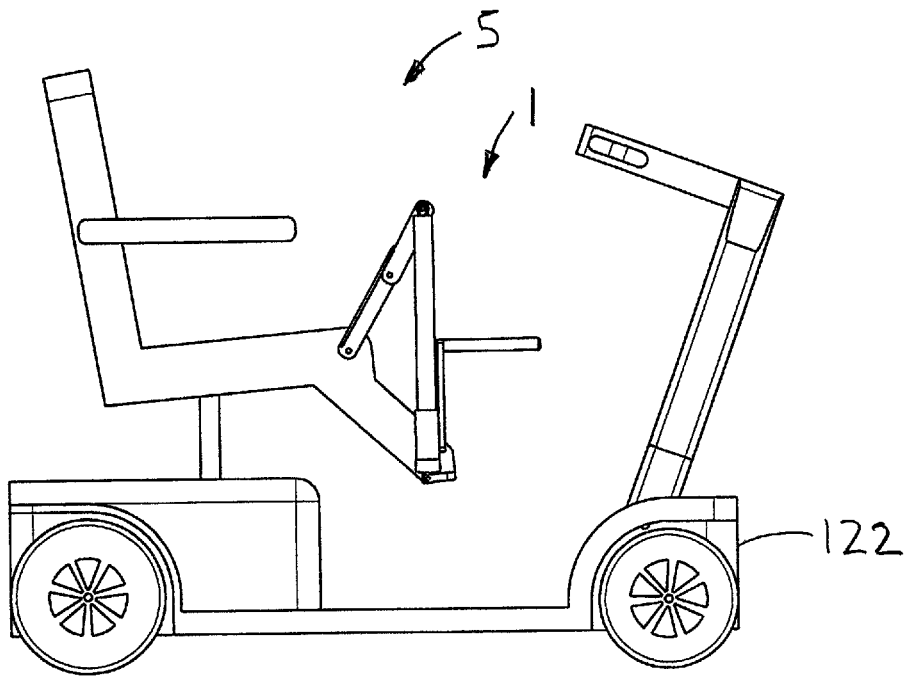
FIG. 21 is a side view of a lift assist device attached to a motorized scooter and with lift projections in a lowered position in accordance with the present invention.
Figure 22:
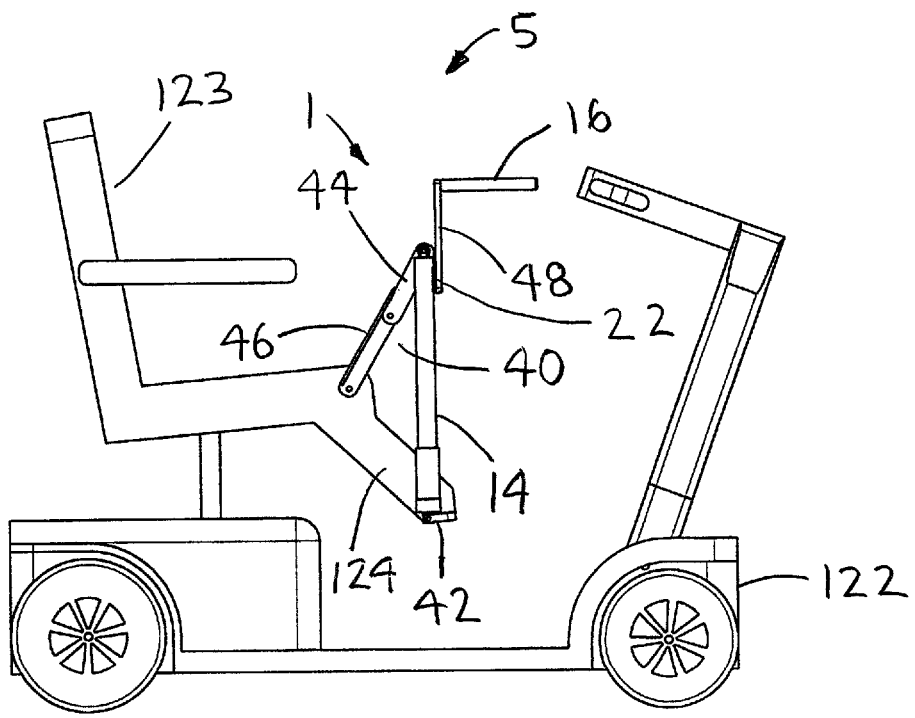
FIG. 22 is a side view of a lift assist device attached to motorized scooter and with lift projections in a raised position in accordance with the present invention.

With reference to FIGS. 13-16, a motorized wheelchair with a lift assist device 4 preferably includes the lift assist device 1, a motorized wheelchair 118, a wheelchair top pivoting bracket 32 and a wheelchair bottom bracket 34. The wheelchair top pivoting bracket 32 preferably includes a first wheelchair leg 36 and a second wheelchair leg 38. One end of the first wheelchair leg 36 is pivotally engaged with one end of the second wheelchair leg 38. An opposing end of the first wheelchair leg 36 is pivotally engaged with a top of the linear actuator 14. An opposing end of the second wheelchair leg 38 is pivotally secured to a seat side frame 120 of the motorized wheelchair 118. By attaching the linear actuator 14 to the seat side frame 120, the lift unit 10 will be raised, lowered and swiveled, when a seat 119 is raised, lowered and swiveled. One end of the wheelchair bottom bracket 34 is attached to a bottom of the seat side frame 120. A bottom of the linear actuator 14 is pivotally engaged with an opposing end of the wheelchair bottom bracket 34. With reference to FIGS. 17-18, the motorized wheelchair lift assist device 4 may be used to help lift a user 102 from the chair 104 adjacent the motorized wheelchair 118 or from the motorized wheelchair 118. Further, the motorized wheelchair with a lift assist device 4 may be used to allow the user 102 to ease themself into the chair 104 or the motorized wheelchair 118.

With reference to FIGS. 19-22 and 25, a motorized scooter lift assist device 5 preferably includes the lift assist device 1, a motorized scooter 122, a scooter top pivoting bracket 40 and a scooter bottom bracket 42. The scooter top pivoting bracket 40 preferably includes a first scooter leg 44 and a second scooter leg 46. One end of the first scooter leg 44 is pivotally engaged with one end of the second scooter leg 46. An opposing end of the first scooter leg 44 is pivotally engaged with a top of the linear actuator 14. An opposing end of the second scooter leg 46 is pivotally secured to a seat side frame 124 of the motorized scooter. One end of the scooter bottom bracket 42 is attached to a bottom of the seat side frame 124. By attaching the linear actuator 14 to the seat side frame 124, the lift unit 10 will be raised, lowered and swiveled, when a seat 123 is raised, lowered and swiveled. A bottom of the linear actuator 14 is pivotally engaged with an opposing end of the wheelchair bottom bracket 42. One end of a projection extender 48 is preferably attached to the screw sled 22. The lift projection 16 is attached to an opposing end of the projection extender 48 to increase a height of the lift projection 16.

Figure 24:
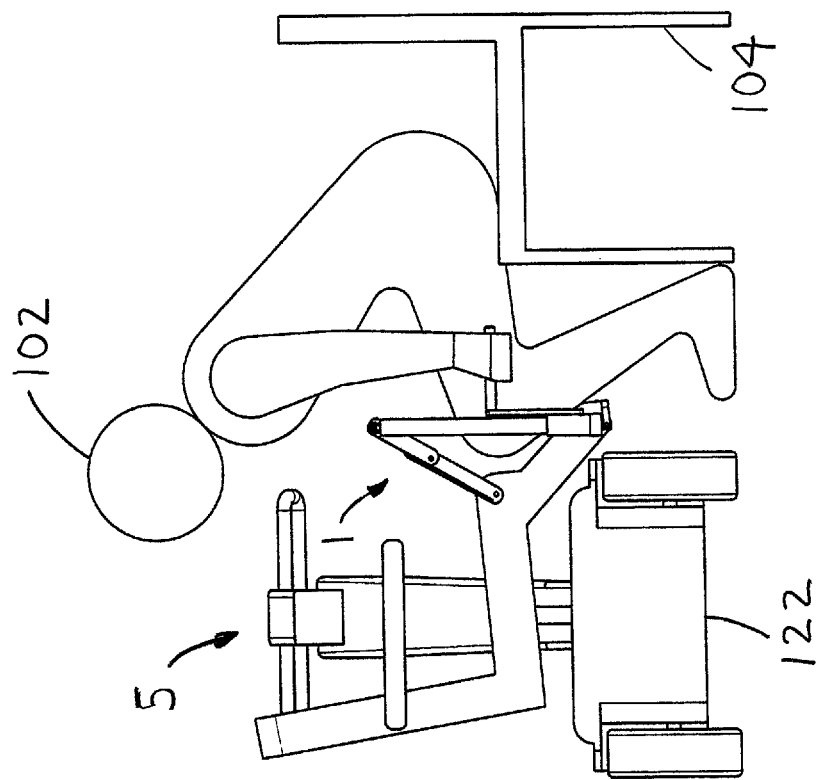
FIG. 24 is a side view of a user sitting in a chair with their hands secured to lift projections of a lift assist device, before linear actuators have raised the lift projections of a motorized scooter with a lift assist device in accordance with the present invention.
Figure 23:
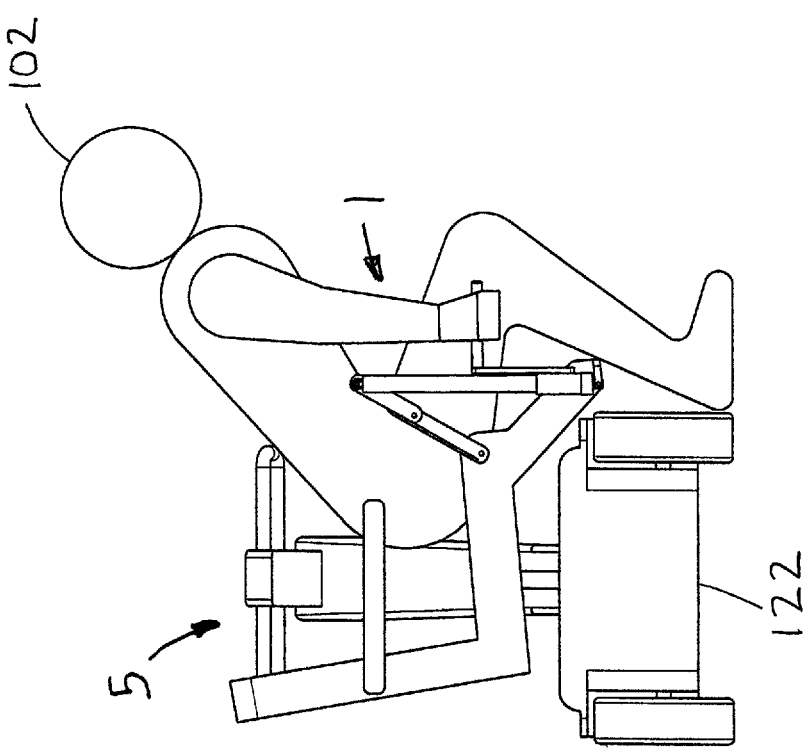
FIG. 23 is a side view of a user sitting in a rotated chair of a motorized scooter with their hands secured to lift projections of a lift assist device, before linear actuators have raised the lift projections of a motorized scooter with a lift assist device in accordance with the present invention.

With reference to FIGS. 23-24, the motorized scooter with a lift assist device 5 may be used to help lift a user 102 from the chair 104 adjacent the motorized scooter 122 or from the motorized scooter 122. Further, the motorized scooter with a lift assist device 5 may be used to allow the user 102 to ease themself into the chair 104 or the motorized scooter 122.

Figure 26:
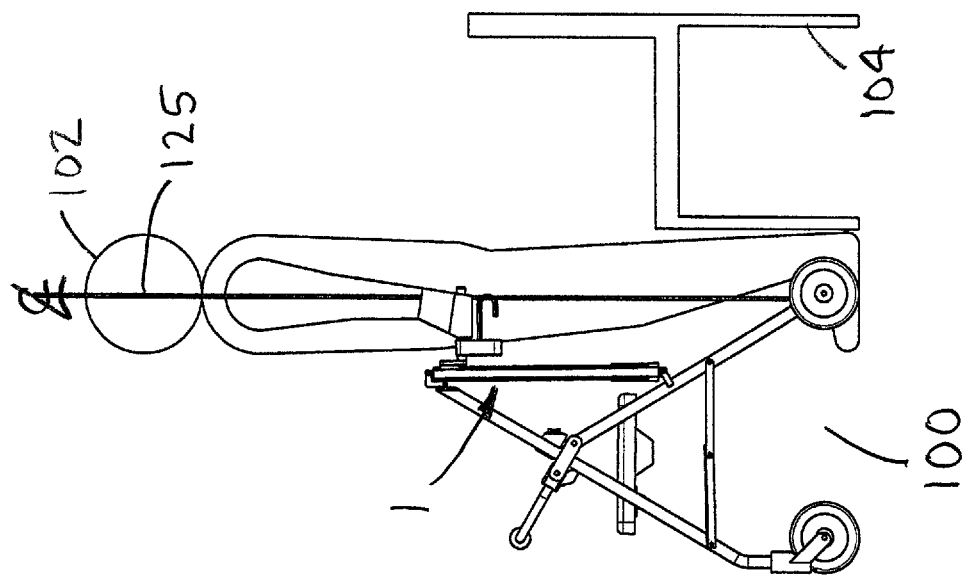
FIG. 26 is a side view of a user sitting in a chair with their body positioned according to a theoretical vertical center of gravity relative to the chair and for grasping lift projections of a lift assist device in accordance with the present invention.
Figure 27:
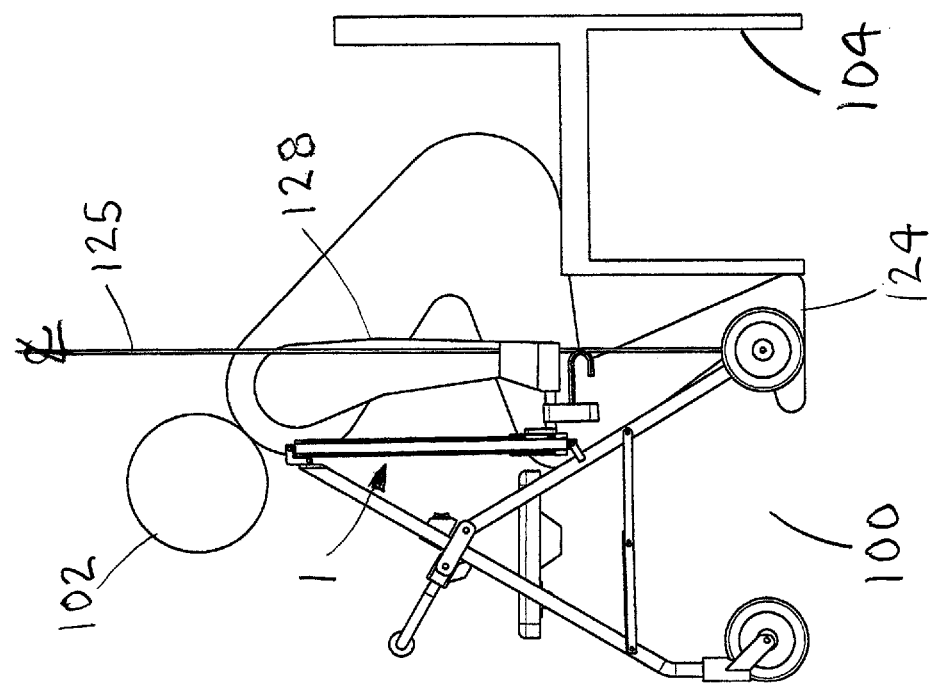
FIG. 27 is a side view of a user standing next to a chair and their grasping lift projections of a lift assist device in a standing position in accordance with the present invention.

With reference to FIGS. 26-27, the user 102 is seated in a position relative to the rollator 100, which is optimized to decrease the amount of force required to lift the user 102, while maintaining a balanced position during the lift. A theoretical vertical centerline 125 runs through a foot 125; a rear wheel 126 of the rollator 100; through arms 128 of the user 102; and the pair of lift projections 16. With the user 102 standing, the theoretical vertical centerline 125 passes through a center of the user 102; the rear wheel 126; and the position of the user 102 is optimized to decrease the amount of force required to lower the user 102 into the chair 104.

Figure 28:
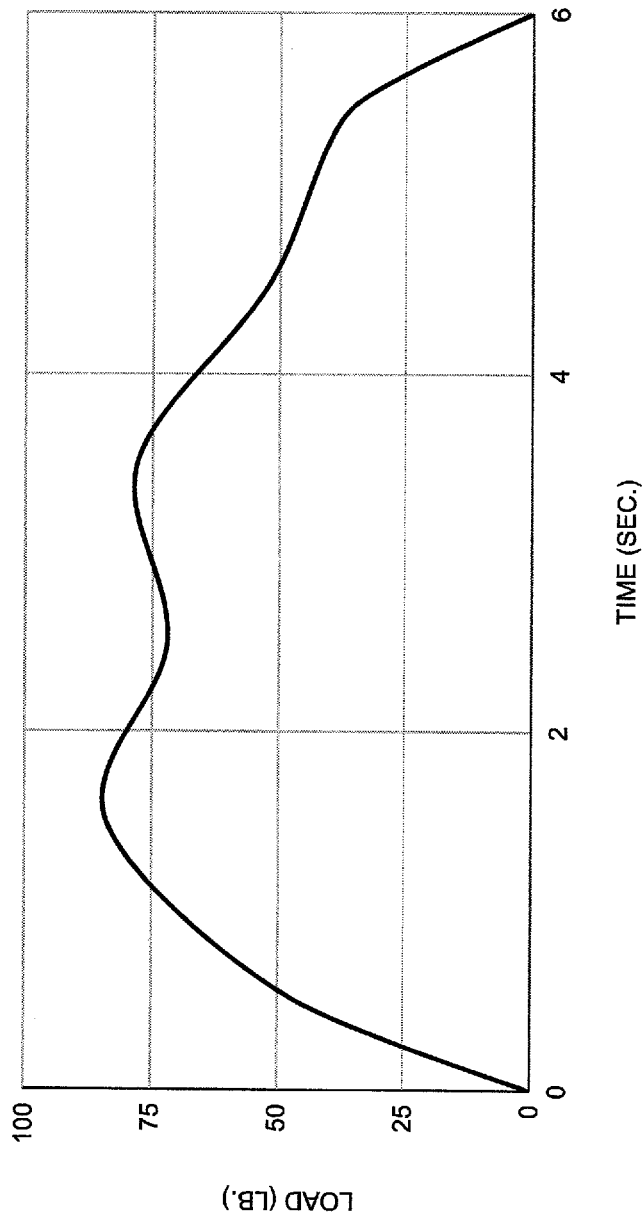
FIG. 28 is a chart of load verses time exerted by a user being raised by a lift assist device.

With reference to FIG. 28, a graph illustrating a rise from a seated position to a standing position is shown with load vs. time utilizing the lift assist device 1 mounted to a rollator 100. The rollator 100 was fitted with two linear actuators 14, two lift handles 16, the battery 12, and controls to allow real world functional testing. A subject used the rollator lift assist device 2 to assist in rising from a chair and also descending to a seated position. The graph shows the rising subject quickly applying an average total load of 50 pounds during the first 1.5 seconds of rise and then increased the average total load to approximately 75 pounds during seconds 1.5 through 4.5. Seconds 4.5 through 6 showed a steady decrease in average total load to 25 pounds ending at 0 pounds when the power was turned off. The power was turned off by the operator when the lift handles 16 had reached a height that would be used for normal walking. This test demonstrated the user's greater dependency on lift assistance during the early stages of rising when their lower body strength was limited by the bend of the legs and the hips. That shows the value of the low lift handle start and end position which provides a straight arm on the theoretical vertical center line, while minimizing the torque on the elbow and shoulder, which also maximizes the use of upper body strength during the early phase of rising when it is need most.

Figure 29:
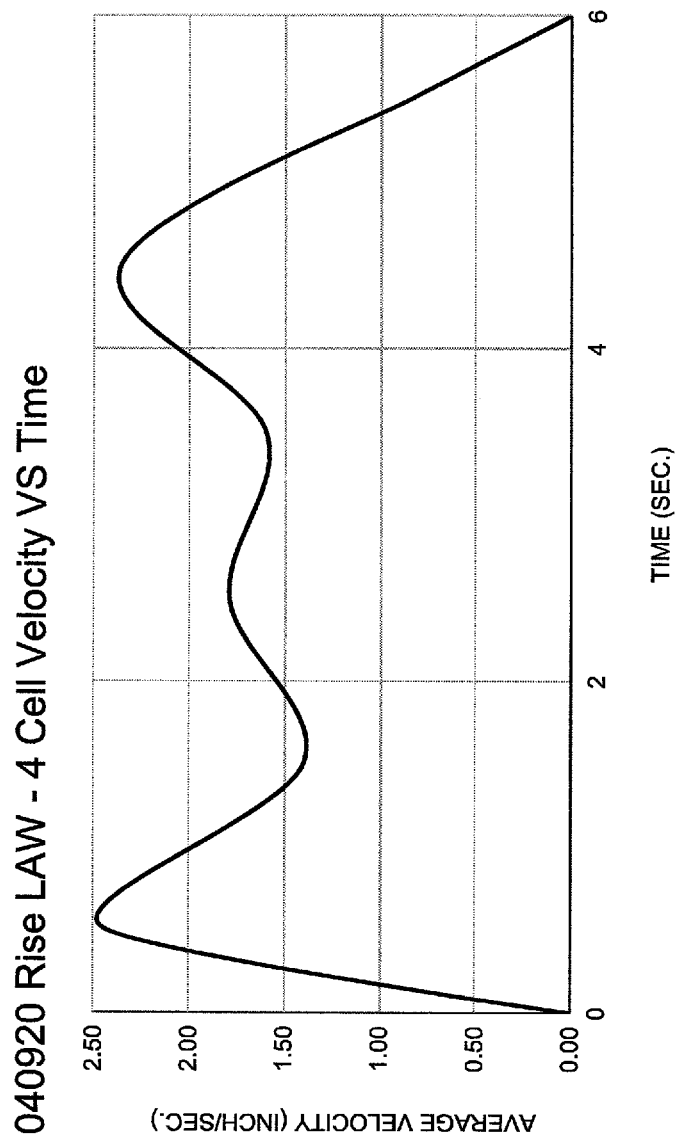
FIG. 29 is a chart of velocity verses time when a user is being raised by a lift assist device.

With reference to FIG. 29, as load is applied to the lift handles 16 during the, rise the velocity decreases. A power level for the lift assist device 1 was chosen to provide the best compromise of maintaining a useful velocity greater than 1.5 in./sec., while retaining a load lift capability of 40 lb. per handle. This minimum velocity helps utilize the momentum of the user to reduce the overall apparatus power requirements, while producing a no-load velocity of 2.5 in./sec. This is adequate for most applications and is particularly useful in encouraging the user to add as much lower and upper body lift contribution as they can to maintain and develop strength. Rehabilitation from many causes of lack of strength or control (injuries, surgeries, joint replacement, strokes, etc.) would particularly benefit. With reference to FIGS. 26-27, the theoretical center of gravity 125 extends from the back of the shoulder to the feet in the initial rising position. It then transitions during rise to the center of the shoulder in the standing position.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A lift assist device for attachment to a mobility apparatus comprising:
   a pair of linear actuators which each include a screw sled and a lift projection, said screw sled moves along at least a portion of a lengthwise axis of said linear actuator when said linear actuator is actuated, said lift projection extends outward from said screw sled, wherein said lift projection is configured to be grasped by a hand for lifting or lowering a patient; and
   at least one bracket capturing one of said pair of linear actuators and being secured to a portion of a mobility apparatus.

2. The lift assist device for attachment to a mobility apparatus of claim 1 wherein:
   each one of said pair of linear actuators includes an electrical motor that rotates a screw.

3. The lift assist device for attachment to a mobility apparatus of claim 1 wherein:
   said mobility device is a rollator.

4. The lift assist device for attachment to a mobility apparatus of claim 1 wherein:
   said mobility device is a wheel chair.

5. The lift assist device for attachment to a mobility apparatus of claim 1 wherein:
   said mobility device is a motorized wheel chair.

6. The lift assist device for attachment to a mobility apparatus of claim 1 wherein:
   said mobility device is a motorized scooter.

7. A lift assist device for attachment to a mobility apparatus comprising:
   a pair of linear actuators which each include a screw sled and a lift projection, said screw sled moves along at least a portion of a lengthwise axis of said linear actuator when said linear actuator is actuated, said lift projection is secured to said screw sled;
   a top bracket having one end engaged with a top of one of said pair of linear actuators, wherein an opposing end is attached to a portion of a mobility apparatus; and
   a bottom bracket having one end engaged with a bottom of one of said pair of linear actuators, wherein an opposing end is attached to a different portion of the mobility apparatus.

8. The lift assist device for attachment to a mobility apparatus of claim 7 wherein:
   each one of said pair of linear actuators includes an electrical motor that rotates a screw.

9. The lift assist device for attachment to a mobility apparatus of claim 7 wherein:
   said mobility device is a rollator.

10. The lift assist device for attachment to a mobility apparatus of claim 7 wherein:
    said mobility device is a wheel chair.

11. The lift assist device for attachment to a mobility apparatus of claim 7 wherein:
    said mobility device is a motorized wheel chair, said top bracket includes a first wheel chair leg and a second wheel chair leg, one end of the first wheelchair leg is pivotally engaged with one end of said second wheelchair leg, an opposing end of said first wheelchair leg is pivotally engaged with a top of one of said pair of linear actuators, an opposing end of said second wheelchair leg is pivotally secured to a seat side frame of said motorized wheelchair.

12. The lift assist device for attachment to a mobility apparatus of claim 7 wherein:
    said mobility device is a motorized scooter, said top bracket includes a first scooter leg and a second scooter leg, one end of said first scooter leg is pivotally engaged with one end of said second scooter leg, an opposing end of said first scooter leg, an opposing end of said second wheelchair leg is pivotally secured to a seat side frame of said motorized scooter.

13. The lift assist device for attachment to a mobility apparatus of claim 1 wherein:
    said lift projection extends directly outward from said screw sled.

14. A lift assist device for attachment to a mobility apparatus comprising:
    a pair of linear actuators which each include a screw sled and a lift projection, said screw sled moves along at least a portion of a lengthwise axis of said linear actuator when said linear actuator is actuated, said lift projection is secured to said screw sled;
    a power switch is accessible when grasping said lift projection, said on-off switch is used to power said pair of electrical motors; and
    at least one bracket capturing one of said pair of linear actuators and being secured to a portion of a mobility apparatus.

15. The lift assist device for attachment to a mobility apparatus of claim 14 wherein:
    each one of said pair of linear actuators includes an electrical motor that rotates a screw.

16. The lift assist device for attachment to a mobility apparatus of claim 14, further comprising:
    a hand brake extending from at least one of said pair of lift projections.

17. The lift assist device for attachment to a mobility apparatus of claim 14 wherein:
    said mobility device is a rollator.

18. The lift assist device for attachment to a mobility apparatus of claim 14 wherein:

said mobility device is a wheel chair.

19. The lift assist device for attachment to a mobility apparatus of claim 14 wherein:

said mobility device is a motorized wheel chair.

20. The lift assist device for attachment to a mobility apparatus of claim 14 wherein:

said mobility device is a motorized scooter.

\* \* \* \* \*